United States Patent [19]

Delmore et al.

[11] Patent Number: 4,757,967

[45] Date of Patent: Jul. 19, 1988

[54] BOX SUPPORT

[75] Inventors: Martin F. Delmore, Seven Hills; John D. Langdon, Avon Lake, both of Ohio

[73] Assignee: Erico International Corporation, Solon, Ohio

[21] Appl. No.: 903,027

[22] Filed: Sep. 2, 1986

[51] Int. Cl.⁴ .............................................. E04G 3/00
[52] U.S. Cl. ................................ 248/218.4; 248/27.1; 248/DIG. 6
[58] Field of Search .......... 248/27.1, 57, 546, DIG. 6, 248/342, 343, 218.4, 205.1; 52/39, 678; 220/3.5, 3.9

[56] References Cited

U.S. PATENT DOCUMENTS

| | | | |
|---|---|---|---|
| 1,156,885 | 10/1915 | Caine | 248/218.4 |
| 1,550,327 | 8/1925 | Ryniewicz | 174/63 |
| 1,800,813 | 4/1931 | Banfield | 174/63 |
| 2,963,253 | 12/1960 | Maier et al. | 248/DIG. 6 |
| 3,053,494 | 9/1962 | Stoll | 248/DIG. 6 X |
| 3,518,421 | 6/1970 | Cogdill | 248/57 |
| 3,528,636 | 9/1970 | Schmidt | 248/57 |
| 3,588,019 | 6/1971 | Cozeck | 248/DIG. 6 X |
| 4,122,762 | 10/1978 | Williams | 52/39 X |

Primary Examiner—J. Franklin Foss
Attorney, Agent, or Firm—Renner, Otto, Boisselle & Lyon

[57] ABSTRACT

An electrical box support for supporting an electrical box or other like device in a studded wall. The box support comprises a horizontal strut having a centrally located outwardly opening horizontally extending V-shape channel and a pair of legs formed at each end thereof. The purpose of the V-shape channel is to facilitate horizontal positioning or alignment of such boxes, to facilitate fastening, and also to strengthen the strut. Separating each leg of a leg pair is a cut-out which allows each of the legs to flex and bend independent of the other. To rigidify further and strengthen the box support, the invention further provides a pair of flanges or ribs formed along the lateral edges of the horizontal strut.

18 Claims, 1 Drawing Sheet

U.S. Patent     Jul. 19, 1988     4,757,967
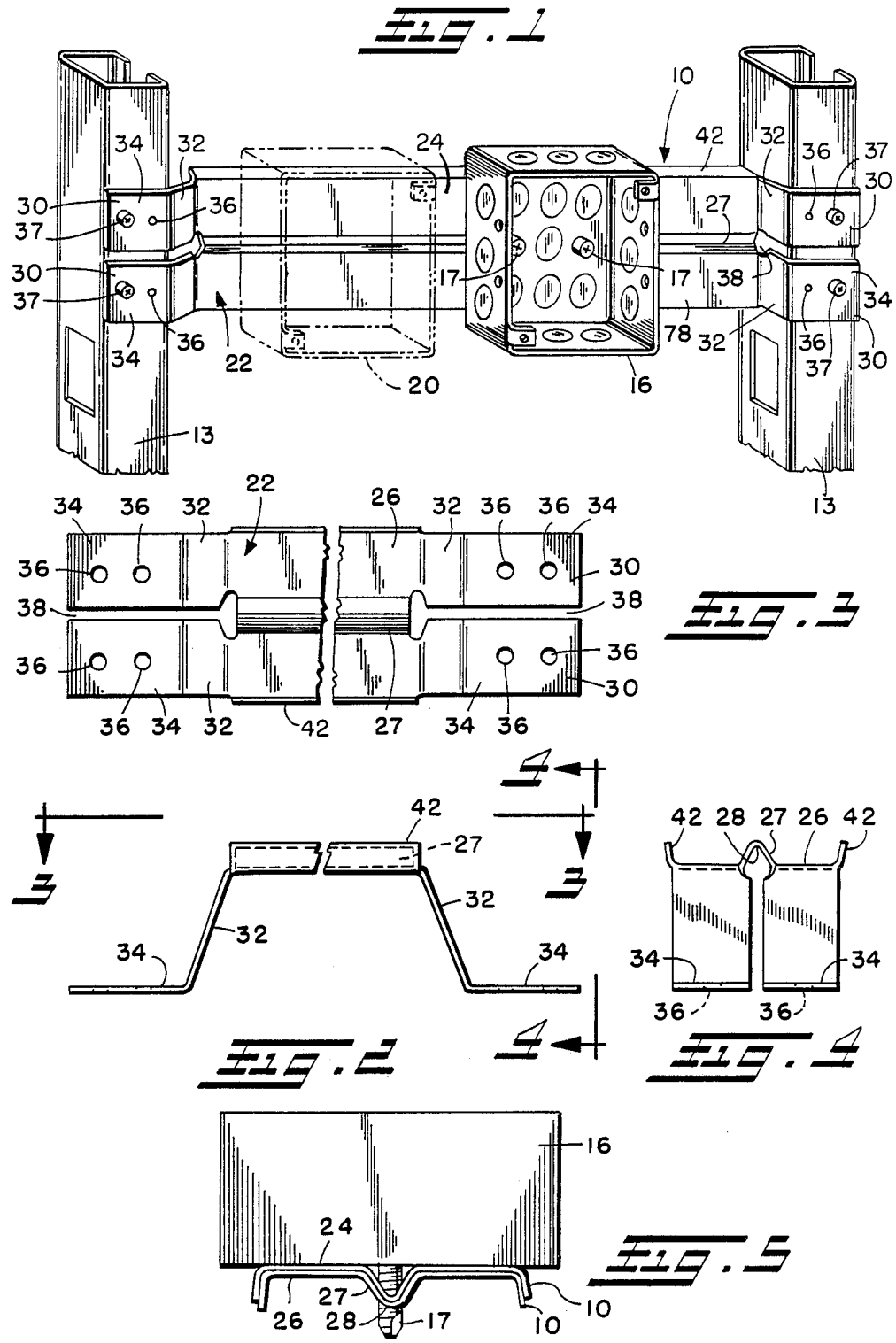

BOX SUPPORT

DISCLOSURE

This invention relates to a support for electrical boxes and other like devices. More particularly, this invention relates to an electrical box support for supporting electrical boxes in a studded wall.

BACKGROUND OF THE INVENTION

Various means and methods have existed in the prior art for supporting an electrical box or other like device within a studded wall. Such prior art means and methods include various clips for mounting a box or device contiguous with a stud, and threaded or unthreaded bars which are inserted through openings in the studs and clipped to the studs, the box or device then being clipped to the rod.

Although these prior art devices provided a means for supporting an electrical box or device in a studded wall, such prior art devices present various disadvantages and drawbacks. For example, the clips for mounting a box contiguous with a stud significantly limit the number of locations to which an installer may install a box within a studded wall. Also, such clips usually prevent an installer from mounting a plurality of boxes in a horizontal row. Furthermore, such clips are usually only capable of providing a limited degree of support to the box mounted therewith. With respect to the bars, in order to provide a mounting of sufficient strength such bars have a large diameter or size and in turn they require that the studs have a fairly significant hole through which the bars can be inserted. Many times, for example, when utilizing wood studs, such holes are undesirable because they significantly weaken the wood studs.

While prior art bar hanger systems are adequate to meet certain code requirements of a secure mechanical connection if the box or other device has rigid electrical conduit connected to it, such systems may not be adequate if a flexible wiring or cable system is used. Using flexible wiring systems, such prior art systems suffer what is known as "wobble" and "push back". Also, such prior art hangers are somewhat difficult horizontally to align with other similar hangers in the same room, particularly if the hanger requires the stud web to be pierced.

The instant invention provides a box support which overcomes these and other disadvantages and drawbacks from which the prior art supports suffer.

SUMMARY OF THE INVENTION

The present invention provides a box support for installation between the adjacent studs of a studded wall. The box support, which may be produced from a variety of materials, is utilized to support a variety of objects and devices at desired locations within the studded walls. Specifically, the box support provides a means for securing within a studded wall such devices as electrical fuse boxes, speakers, junction boxes, outlets, switch boxes, fire alarms, thermostats, and the like. Such devices may be supported within the wall so as to provide a flush fit between the device and the outer covering on the wall such as drywall, plaster, paneling, or the like, or alternatively such devices may be supported by the box support in such a manner that the device is completely hidden and enclosed within the studded wall by the outer covering.

A box support made in accordance with the present invention comprises a horizontal strut having two major surfaces, one of which serves as a mounting location for such previously mentioned devices. Preferably the horizontal strut includes an outwardly opening V-shape channel located in the middle of the major surfaces. The V-shape channel, in addition to strengthening the strut, serves to mark the center of the strut allowing the user of the strut readily to align, position and secure one or more devices upon the strut.

Located at each end of the strut are a pair of legs which facilitate the mounting of the box support to adjacent studs of a studded wall. Each of the legs includes a first portion extending almost normal to the axis of the strut and a second portion extending almost normal to the first portion and parallel to the axis of the horizontal strut.

Separating each leg of a leg pair is cut-out which extends from the ends of the horizontal strut. Such cut-out, which is centrally located and aligned with respect to the middle of the horizontal strut, allows each of the legs to flex independently thus providing for some flexibility when attaching the box support to the adjacent studs. Furthermore, since the cut-outs are centrally located relative to the middle of the strut, the cut-outs allow a user readily to level, align and properly position the box support within the studded wall.

To further strengthen and rigidify the box support the invention also provides for a pair of flanges or ribs formed along the lateral edges of the horizontal strut. Furthermore, because of the unique configuration of a box support made in accordance with the present invention, the box supports may be used in tandem to provide an even stronger and more secure mounting location within a studded wall. Also, the box supports, being of sheet metal, may readily be field cut and two may be telescoped to provide a variable length, with the fasteners used to position and secure the box or the like to the support also holding the two telescoped parts together.

To the accomplishment of the foregoing and related ends, the invention, then, comprises the features hereinafter fully described and particularly pointed out in the claims, the following description and annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings:

FIG. 1 is an isometric view of an electrical box support made in accordance with the present invention mounted between a pair of adjacent studs and having mounted thereon an electrical box;

FIG. 2 is a broken top plan view of the electrical box support illustrated in FIG. 1;

FIG. 3 is a broken rear plan view of the electrical box support seen from line 3—3 of FIG. 2;

FIG. 4 is an end view of the electrical box support seen from line 4—4 of FIG. 2; and FIG. 5 is a cross-section of a pair of electrical box supports telescoped or stacked one upon the other and supporting an electrical box.

DETAILED DESCRIPTION OF THE PREFERRED EMBODIMENT

Referring to the drawing, and initially to FIG. 1 there is illustrated a box support 10 made in accordance with the present invention mounted between the studs 13 of a studded wall. The box support 10 may be made from any one of a variety of materials including aluminum sheet, steel sheet, galvanized steel sheet, plastic, and the like, and may be fabricated by various techniques known to those skilled in the art including, for example, stamping, roll forming, extrusion, and combinations thereof.

Illustrated in FIG. 1, the box support 10 is shown supporting an electrical box 16. Box 16 may be attached to support 10 utilizing any variety of means including the illustrated self tapping sheet metal fasteners or screws 17. Also, as shown by phantom electrical box 20, the box support 10 may accomodate a plurality of electrical boxes. Furthermore, in addition to supporting electrical boxes, the box support 10 may support any one of a variety of devices including electrical switch boxes, junction boxes, outlets, fuse boxes, speaker boxes, fire alarms, smoke detectors, thermostats and the like.

Referring now also to FIGS. 2-4, the various elements of the box support 10 include a horizontal strut 22 having a first major or front face 24 which provides a mounting surface for box 16, a second major or rear face 26 oriented directly opposite face 24, and an outwardly opening V-shape horizontal channel 27 formed in the middle of the strut 22. As illustrated the channel forms a symmetrical V-shape groove in the center of the front face. The walls extend at about 60° to the face and the channel may be about ¼ inch deep. Channel 27 serves not only to reinforce the strut 22, but its sharp apex or bight portion 28 serves also to mark the center of the strut 22 thus allowing a user of the support 10 readily and properly to align and position one or more devices upon the support 10. Channel 27 also serves as a guide for the fasteners 17 which are being used to mount the box 16, such fasteners 17 being guided to the apex 28 of the V-shape channel 27. This guiding ability of the channel 27 can become extremely useful when the user is installing the box 16 and fasteners 17 with a power actuated tool which affords minimal control over the position and driving angle of the fasteners 17.

Formed from each of the ends of the strut 22 are a pair of legs 30 which facilitate the attachment of the support 10 to studs 13. Each leg includes a first portion 32 which is outwardly angled but almost normal to the axis of the strut 22 and a second portion 34 which is oriented generally parallel to the axis of the strut 22 and almost normal to the first portion 32. The preferred angle of the leg portions 32 is about 15° from the normal position.

The second portions 34 further include one or more apertures 36 to facilitate the insertion of fasteners 37 when a user is installing the box support 10. The depth to which the front face 24 or the mounting surface of the box support 10 is located relative to the studs 13 is a function of the length of the first portions 32 of the legs 30. Thus, depending on the size of the device or devices to be mounted upon box support 10, the length of the first portions 32 of legs 30 may be appropriately tailored to provide for the desired depth of mounting. Of course, first portions 32 may be of any length and may provide for the mounting of the devices in such a manner that the devices are behind, flush, or protruding out of the outer covering of the studded wall.

Separating each of the legs 30 is a cut-out 38. Cut-outs 38 allow the legs to bend and flex independently of each other so as to allow for some adjustment in the positioning of the legs 30 while attaching the box support 10 to the studs 13. Each cut-out 38 is enlarged at its inner end as indicated at 39 for manufacturing and flexing purposes. Also, since the cut-outs 38 are centrally disposed or aligned with respect to V-shape channel 27, such cut-outs 38 assist a user in locating the center of the box support 10 and properly aligning, leveling, and locating the box support 10. In this manner leveling of various supports around a room may be obtained by placing level marks on the stud flanges to which the supports are to be fastened, and then aligning the narrow gap or slit of such cut-outs 38 between the leg portions 34 with such leveling marks.

Further to rigidify and strengthen the horizontal strut 22, the invention also provides for a pair of ribs or flanges 42 formed from the lateral or top and bottom edges of the horizontal strut 22. Such flanges 42 flare slightly away from each other to facilitate telescoping as hereinafter described.

As illustrated in FIG. 5, the box supports 10 may be stacked one upon the other to provide an even stronger and more rigid mounting for box 16. Also, as illustrated in FIG. 5, such supports may be telescoped together to provide a support of variable length. In some situations this may be required. For example, the supports may be provided in two standard lengths, e.g. 16 inches and 24 inches, which is related to standards of stud spacing. However, variations in such lengths may be obtained providing for shorter than 16 inches and even longer than 24 inches, and infinite variations therebetween. This may be accomplished by field cutting or shearing the end legs off of two supports, then overlapping or telescoping the two supports, with the remaining legs being at opposite ends of the assembly. When the box or boxes 16 are centered and secured to the support by such fasteners 17, such fasteners not only function to secure the box or boxes to the face, but also serve to secure the two telescoped sections together. Also additional fasteners may be employed for the latter purpose. The two telescoped sections may each be of either length. It will also be appreciated that the V-shape channel 27, not only facilitates such overlapping or telescoping, but helps in maintaining the alignment of the two parts.

Although the box support 10 has been illustrated above mounted to metal studs 13, it will be appreciated that box support 10 may easily and readily be mounted to studs having any one of a variety of compositions including wood, concrete, aluminum, and the like.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the following claims.

We claim:

1. An electrical box support for securing with fasteners electrical boxes having substantially flat back surfaces to studded walls, said electrical box support comprising a horizontal strut, means to secure said strut between adjacent studs, said strut comprising a front surface which provides a mounting surface for such box and abuts such back surface of such boxes, and a single V-shape horizontal channel extending along the substantial length of said front surface said strut, said V-shape channel originating from said front surface of said strut such that the apex of said V-shape channel is located rearwardly of said front surface, said V-shape channel serving to ensure that such boxes secured thereto are horizontally aligned with said strut and such fasteners securing such boxes to said strut are aligned with and extend through the apex of said V-shape channel.

2. A box support as set forth in claim 1 wherein said V-shape horizontal channel is positioned in the middle of said strut.

3. A box support as set forth in claim 1 including means at each end of said horizontal strut adjustably to secure said strut to adjacent studs.

4. A box support as set forth in claim 3 wherein said means to secure said horizontal strut between adjacent studs comprises a pair of legs formed at each end of said strut, each of said legs including a first portion which extends almost normal to the axis of said strut and a second portion which extends essentially parallel to the axis of said strut.

5. A box support as set forth in claim 4 wherein said first portion extends at an angle of approximately 15° to said normal to the axis of said strut.

6. A box support as set forth in claim 5 wherein said means at each end of said horizontal strut adjustably to secure said strut to adjacent studs includes a cut-out originating from the end of said strut which serves to separate each of the legs of said leg pair formed at each end of said strut permitting each of said legs to bend and flex independently of each other.

7. A box support as set forth in claim 6 wherein said cut-outs at each end of said horizontal strut are centrally aligned relative to the middle of said strut.

8. A box support as set forth in claim 7 wherein said second portion of each of said legs includes at least one aperture to facilitate the mounting of said support to such studs with fasteners.

9. A box support as set forth in claim 1 wherein at least one of the lateral edges of said horizontal strut includes a reinforcing flange extending along at least a portion thereof.

10. A box support as set forth in claim 9 wherein said flanges are slightly outwardly flared to facilitate nesting of said box supports.

11. A box support as set forth in claim 9 wherein said support is formed from a galvanized sheet steel.

12. An electrical box support for securing electrical boxes to studded walls comprising a first horizontal strut having a front surface, and a second horizontal strut having a front surface overlappingly nested and interconnected to said first horizontal strut with a fastener, each of said struts having a single V-shape horizontal channel in the middle of said strut extending from the front surface of each of said struts such that the apex of each of said V-shape channels is located rearwardly of its respective front surface, said V-shape channels serving to ensure that such boxes secured thereto are horizontally aligned with said struts and said fastener that is being utilized to interconnect said struts is aligned with and extends through the apex of said V-shape channel, and means at the ends of said struts distally such overlap to secure said struts between adjacent studs.

13. An electrical box support as set forth in claim 12 wherein said fastener in addition to interconnecting said struts also serves to secure such box thereto.

14. An electrical box support as set forth in claim 12 wherein said means to secure said struts between adjacent studs comprises a pair of legs formed at each end distally such overlap, each of said legs including a first portion which extends almost normal to the axis of said struts and a second portion which extends essentially parallel to the axis of said struts.

15. A method of installing an electrical box support between adjacent studs of a studded wall comprising the steps of cutting off and end of a first box support, cutting off one end of a second box support, overlapping and nesting the cut end of such first box support with the cut end of such second box support, interconnecting such first box support to such second box support to form a third box support of a new length, and mounting such third box support between adjacent studs of such studded wall wherein such first and second box supports each include a single centrally disposed V-shaped horizontal channel to ensure that each of such box supports and boxes attached thereto are horizontally aligned.

16. A method as set forth in claim 15 wherein such first box support is interconnected to such second box support by a fastener which also serves to secure a box of such box supports.

17. A method of installing an electrical box support between adjacent studs of a studded wall comprising the steps of cutting off one end of such box support to form a cut-off portion, overlappingly nesting and telescoping said cut-off portion within such cut end of such box support to create a new box support of different shorter length, and interconnecting such cut-off portion to such cut end of such box support with a fastener wherein such cut end of such box support and such cut-off portion both including a single centrally disposed horizontally extending V-shaped channel to ensure that such cut end of said box support and such cut-off portion are horizontally aligned and such boxes attached thereto are horizontally aligned.

18. In combination a box and box support therefor adapted to support and position said box within a wall between vertically extending studs of such wall, said box support comprising a horizontally extending strut having a planar face which provides a mounting surface for said box, means at each end of said strut to support and secure said strut between such studs so that the planar face is recessed with respect to the front of such studs, said strut including a single horizontally extending V-shape channel in the middle of said planar face which is recessed rearwardly from said planar face, said box being secured to said planar face, and a plurality of fasteners extending from said box through the apex of said channel, said channel serving both to horizontally align said box secured to said strut and guide said fasteners through said strut whereby said fasteners are aligned with the apex of said channel.

* * * * *